United States Patent
Lin et al.

(10) Patent No.: US 10,048,806 B2
(45) Date of Patent: Aug. 14, 2018

(54) OPTICAL TOUCH SYSTEM AND OPTICAL TOUCH APPARATUS THEREOF

(71) Applicant: Wistron Corporation, New Taipei (TW)

(72) Inventors: Yen-Ting Lin, New Taipei (TW); Chia-Chang Hou, New Taipei (TW); Po-Liang Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 65 days.

(21) Appl. No.: 14/944,227

(22) Filed: Nov. 18, 2015

(65) Prior Publication Data

US 2017/0038911 A1 Feb. 9, 2017

(30) Foreign Application Priority Data

Aug. 5, 2015 (TW) .............................. 104125347 A (51) Int. Cl.
*G06F 3/042* (2006.01)
*G06F 3/0354* (2013.01)

(52) U.S. Cl.
CPC ........ *G06F 3/0421* (2013.01); *G06F 3/03545* (2013.01)

(58) Field of Classification Search
CPC ...................................................... G06F 3/042
See application file for complete search history.

(56) References Cited

U.S. PATENT DOCUMENTS

| 4,933,544 | A | * | 6/1990 | Tamaru | G06F 3/0421 250/221 |
|---|---|---|---|---|---|
| 6,100,538 | A | * | 8/2000 | Ogawa | G06F 3/03545 178/18.09 |
| 8,089,462 | B2 | * | 1/2012 | Hill | G06F 3/0428 345/157 |
| 8,749,502 | B2 | * | 6/2014 | Lee | G06F 1/1673 178/18.01 |
| 2005/0146518 | A1 | * | 7/2005 | Wang | G06F 3/03545 345/179 |
| 2005/0248539 | A1 | * | 11/2005 | Morrison | G06F 3/0418 345/173 |
| 2009/0315864 | A1 | * | 12/2009 | Silverbrook | G06F 3/03545 345/179 |
| 2016/0259402 | A1 | * | 9/2016 | Masuda | G06F 3/0425 |
| 2017/0017344 | A1 | * | 1/2017 | Kuribayashi | G06F 3/0418 |

* cited by examiner

*Primary Examiner* — Dorothy Harris
(74) *Attorney, Agent, or Firm* — JCIPRNET (57) ABSTRACT

An optical touch system including an optical touch apparatus and an optical touch stylus is provided. The optical touch apparatus includes a curved operation surface and a plurality of optical sensors. The curved operation surface has a vertex. The optical touch stylus performs a touch operation on the curved operation surface, and has a tip portion for generating a light signal. The optical sensors are arranged on a side of the curved operation surface based on a reference line. The optical sensors are configured to receive the light signal to sense the touch operation of the optical touch stylus performed on the curved operation surface. A surface sag exists between each of the optical sensors and the vertex. A difference between a tip length of the optical touch stylus and a distance of two selected surface sags is not smaller than a region parameter of the optical touch system.

25 Claims, 4 Drawing Sheets

OPTICAL TOUCH SYSTEM AND OPTICAL TOUCH APPARATUS THEREOF

CROSS-REFERENCE TO RELATED APPLICATION

This application claims the priority benefit of Taiwan application serial no. 104125347, filed on Aug. 5, 2015. The entirety of the above-mentioned patent application is hereby incorporated by reference herein and made a part of this specification.

BACKGROUND

Field of the Invention

The invention is directed to a touch system and a touch apparatus thereof and more particularly, to an optical touch system and an optical touch apparatus thereof.

Description of Related Art

Generally, optical touch systems can classified into two types, a blocking type or a non-blocking type. In an optical touch system of the blocking type, optical sensors sense a shadow of a touch object that the brightness is relatively lower than the background on a basis of signal blocking that the touch object blocks a light signal emitted by a light source (e.g., a string of light emitting diodes or a reflective strip), such that an occurring position of the touch object and its corresponding touch operation can be determined. On the other hand, an optical touch system of the non-blocking type usually includes an optical touch stylus or the use of a finger and is configured to perform a touch operation on a flat plane display to transmit a light signal to the optical sensors. For example, in a non-blocking type optical touch system using an optical touch stylus, the light signal transmitted from the optical touch stylus to the optical sensors may be actively generated from the internal of the optical touch stylus, or generated by the optical touch stylus reflecting back the light signal transmitted by a light source attached to each optical sensor according to the type of the optical touch stylus. Therefore, the optical sensors can determine the occurring position of the touch object and its corresponding touch operation according to the received light signal with a brightness which is relatively higher than the background.

The aforementioned available optical touch systems are commonly applied to fully planar displays, banners or electronic whiteboards. However, in order to provide better scenarios of usage, curved operation surfaces or televisions have been launched to the market. Nevertheless, in case an optical touch system, taking the non-blocking type optical touch system for example, is installed in the curved operation surface to provide the touch function, when the optical touch stylus performs a touch operation on a curved operation surface, the optical sensors may not be capable of correctly sensing the touch operation performed by the optical touch stylus and its occurring position due to the optical sensors being in an insufficient number or being arranged on improper positions on the curved operation surface, since the optical touch stylus is not on the flat plane during the process of moving on the surface, and as a result, mis-determination occurs.

SUMMARY

The invention provides an optical touch system and an optical touch apparatus thereof capable of correctly sensing a touch operation of an optical touch stylus and a position where it occurs.

According to an embodiment of the invention, an optical touch system including a curved operation surface, an optical touch stylus and a plurality of optical sensors is provided. The curved operation surface has a vertex. The optical touch stylus is configured to perform a touch operation on the curved operation surface and has a tip portion capable of generating a light signal. The optical sensors are arranged on at least one side of the curved operation surface based on a reference line. The optical sensors are configured to receive the light signal to sense the touch operation of the optical touch stylus performed on the curved operation surface. A surface sag exists between each of the optical sensors and the vertex tip portion. A difference between a tip length of the optical touch stylus and a distance of two selected surface sags is not smaller than a region parameter of the optical touch system.

According to an embodiment of the invention, an optical touch apparatus for sensing a touch operation of an optical touch stylus is provided. The optical touch apparatus includes a curved operation surface and a plurality of optical sensors. The curved operation surface has a vertex. The optical sensors are arranged on at least one side of the curved operation surface based on a reference line. The optical sensors are configured to receive a light signal to sense the touch operation of the optical touch stylus performed on the curved operation surface. A surface sag exists between each of the optical sensors and the vertex. A difference between a tip length of the optical touch stylus and a distance of two selected surface sags is not smaller than a region parameter of the optical touch system.

To sum up, in the embodiments of the invention, the difference between the tip length of the optical touch stylus and the distance of the two selected surface sags is not smaller than the region parameter of the optical touch system. Such design manner may facilitate in increasing accuracy of the optical sensors sensing the touch operation and the touch position of the optical touch stylus.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

A plurality of exemplary embodiments are provided below to describe the disclosure, though the disclosure is not limited to the provided exemplary embodiments, and the exemplary embodiments may also be suitably combined. A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. Moreover, a term "signal" refers to at least a current, a voltage, an electric charge, a temperature, data, an electromagnetic wave or any other one or a plurality of signals.

Figure 1:
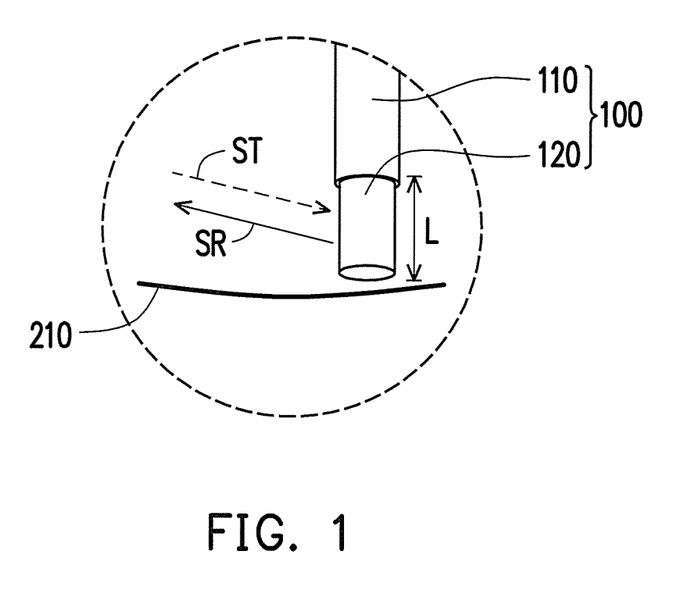
FIG. 1 is a schematic diagram illustrating an optical touch stylus according to an embodiment of the invention.
Figure 2:
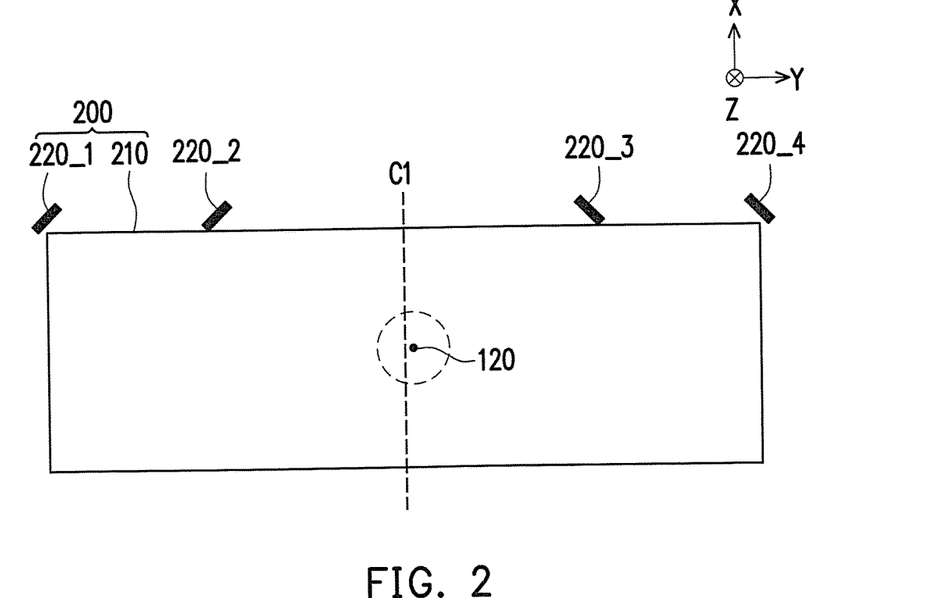
FIG. 2 is a schematic front-view diagram illustrating an optical touch system according to an embodiment of the invention.
Figure 3:
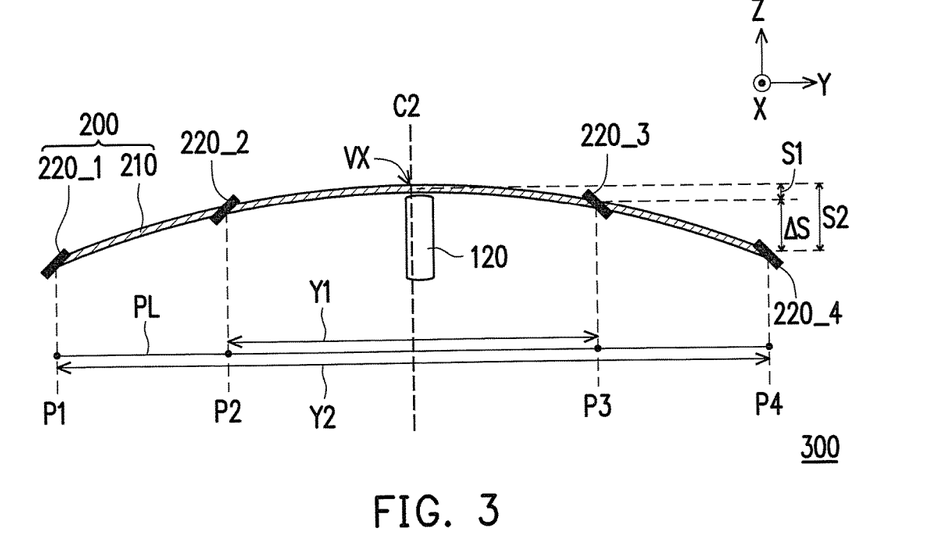
FIG. 3 is a schematic top-view diagram illustrating the optical touch system according to the embodiment depicted in FIG. 2.

FIG. 1 is a schematic diagram illustrating an optical touch stylus according to an embodiment of the invention. FIG. 2 is a schematic front-view diagram illustrating an optical touch system according to an embodiment of the invention. FIG. 3 is a schematic top-view diagram illustrating the optical touch system according to the embodiment depicted in FIG. 2. With reference to FIG. 1 to FIG. 3, an optical touch system 300 of the present embodiment includes an optical touch stylus 100 and an optical touch apparatus 200. The optical touch apparatus 200 includes a curved operation surface 210 and a plurality of optical sensors 220_1 to 220_4. In the present embodiment, the curved operation surface 210 is, for example, a front surface of a framed or frameless display, which is not limited in the invention, and the curved operation surface 210 may also be a surface of a device that is capable of displaying or projecting messages, such as a television, a banner, an electronic whiteboard or the like.

Specifically, with reference to FIG. 1, the optical touch stylus 100 of the present embodiment is configured to perform a touch operation on the curved operation surface 210. In the present embodiment, the optical touch stylus 100 includes a body portion 110 and a tip portion 120. The tip portion 120 is assembled to the body portion 110. The tip portion 120 is configured to transmit a light signal SR to the optical sensors 220_1 to 220_4. A tip length L of the optical touch stylus 100 is a length of the tip portion 120. In the present embodiment, the optical touch stylus 100 may be a reflective stylus or an active stylus. In the present embodiment, taking the reflective stylus for example, the tip portion 120 of the optical touch stylus 100 includes a reflection layer. The reflection layer includes an optical retro-reflection material and is configured to reflect an original light signal ST generated and output to the optical touch stylus by each optical sensor, and a portion of the light signal SR is reflected back to each optical sensor along an incident direction by a micro-structure inside the tip portion 120. Thus, each optical sensor is configured to receive the light signal SR to sense the touch operation performed by the optical touch stylus 100 on the curved operation surface 210. Meanwhile, each optical sensor determines a touch position of the optical touch stylus 100 on the curved operation surface 210 according to the light signal SR reflected by the tip portion 120.

In an embodiment, the optical touch stylus 100 may also be an active stylus. In the present embodiment, the body portion 110 of the optical touch stylus 100 drives the tip portion 120 (which contains a light emitting diode (LED), for example) to directly output the light signal SR to transmit a portion of the light signal SR to each optical sensor. Each optical sensor determines the touch position of the optical touch stylus 100 on the curved operation surface 210 according to the light signal SR output by the tip portion 120. In other words, the type of the optical touch stylus 100 is not limited in the invention and may be a reflective stylus or an active stylus. Additionally, enough teaching, suggestion, and implementation illustration with respect to an operation method of the optical touch stylus 100 of the present embodiment may be obtained based on the ordinary knowledge of the art and thus, will not be repeated.

With reference to FIG. 2 and FIG. 3, according to the front view in FIG. 2, the optical sensors 220_1 to 220_4 are arranged on an upper side of the curved operation surface 210 based on a reference line C1, for example. According to the top view in FIG. 3, the optical sensors 220_1 to 220_4 are arranged on the upper side of the curved operation surface 210 based on a reference line C2, for example. In an embodiment, the optical sensors 220_1 to 220_4 may also be arranged on a lower side of the curved operation surface 210 based on the reference line C1 or C2, which is not limited in the invention.

In the present embodiment, the optical sensors 220_1 to 220_4 include a first pair of the optical sensors 220_2 and 220_3 and a second pair of the optical sensors 220_1 and 220_4. Each optical sensor actually includes a light-sensing element and a light-emitting element. The first pair of the optical sensors 220_2 and 220_3 is symmetrically arranged on the upper side of the curved operation surface 210 based on the reference line C2. The first pair of the optical sensors 220_2 and 220_3 has a first surface sag S1 relative to a vertex VX of the curved operation surface 210. A projection spacing of the first pair of the optical sensors 220_2 and 220_3 on the projection line PL is Y1. In the present embodiment, the second pair of the optical sensors 220_1 and 220_4 is symmetrically arranged on the upper side of the curved operation surface 210 based on the reference line C2. The second pair of the optical sensors 220_1 and 220_4 has a second surface sag S2 relative to the vertex VX of the curved operation surface 210. A projection spacing of the second pair of the optical sensors 220_1 and 220_4 on the projection line PL is Y2. In the present embodiment, projection positions P2 and P3 of the first pair of the optical sensors 220_2 and 220_3 on the projection line PL are located between projection positions P1 and P4 of the second pair of the optical sensors 220_1 and 220_4 on the projection line PL. Thus, the projection spacing Y1 is smaller than the projection spacing Y2. In the present embodiment, a surface sag distance $\Delta S$, i.e. $\Delta S = S2 - S1$, exists between the first surface sag S1 and the second surface sag S2. A surface sag refers to a distance between a tangent plane passing through a vertex of a curved surface and a plane passing through any specific point on the curved surface and in parallel to the tangent plane, and in the present embodiment, it refers to a vertical distance from a connection between the optical sensor pairs to the vertex of the curved operation surface.

In the present embodiment, the surface sag distance $\Delta S$ of the optical sensors 220_1 to 220_4 is determined, for example, according to a region parameter of the optical touch system 300 and the tip length L of the optical touch stylus 100. The relation among the tip length L, the surface sag distance $\Delta S$ and the region parameter meet the following expression (1):

$$L - \Delta S \geq ORA \quad (1)$$

where ORA (i.e., an optical reflecting area) is the region parameter of the optical touch system 300. Thus, when the tip length L of the optical touch stylus 100 and the region parameter ORA of the optical touch system 300 are determined, in the present embodiment, the surface sag distance ΔS may also be determined, and the surface sag distance ΔS is less than or equal to a difference between the tip length L and the region parameter ORA.

Additionally, in the present embodiment, the surface sag distance ΔS is equal to the distance between the first surface sag S1 and the second surface sag S2, and thus, when positions of the first pair of the optical sensors 220_2 and 220_3 (i.e., the first surface sag S1) arranged on the upper side of the curved operation surface 210 are determined, positions of the second pair of the optical sensors 220_1 and 220_4 (second surface sag S2) arranged on the upper side of the curved operation surface 210 may also be determined according to the surface sag distance ΔS. By contrast, when the positions of the second pair of the optical sensors 220_1 and 220_4 (i.e., the second surface sag S2) arranged on the upper side of the curved operation surface 210 is determined, the positions of the first pair of the optical sensors 220_2 and 220_3 (i.e., the first surface sag S1) arranged on the upper side of the curved operation surface 210 may also be determined according to the surface sag distance ΔS.

In the present embodiment, the first surface sag S1 is determined, for example, according to a curvature radius of the curved operation surface 210 and the projection spacing Y1 of the first pair of the optical sensors 220_2 and 220_3 on the projection line PL. For instance, the relation between the first surface sag S1 of the first pair of the optical sensors 220_2 and 220_3 and the projection spacing Y1 of the first pair of the optical sensors 220_2 and 220_3 on the projection line PL meets the following expression (2):

$$S1 = R - R\sqrt{1 - \left(\frac{Y1}{2R}\right)^2} \quad (2)$$

where R is the curvature radius of the curved operation surface 210.

In the present embodiment, the second surface sag S2 is determined, for example, according to the curvature radius of the curved operation surface 210 and the projection spacing Y2 of the second pair of the optical sensors 220_1 and 220_4 on the projection line PL. For instance, the relation between the second surface sag S2 of the second pair of the optical sensors 220_1 and 220_4 and the projection spacing Y2 of the second pair of the optical sensors 220_1 and 220_4 on the projection line PL meets the following expression (3):

$$S2 = R - R\sqrt{1 - \left(\frac{Y2}{2R}\right)^2} \quad (3)$$

wherein R is the curvature radius of the curved operation surface 210.

Thus, in the present embodiment, when the first surface sag S1 and the second surface sag S2 are determined, the projection spacing Y1 and the projection spacing Y2 may also be respectively determined according to the expressions (2) and (3).

The determination of the region parameter ORA of the present embodiment will be described below.

In the present embodiment, the region parameter ORA is determined according to a display size of the curved operation surface 210, which is illustrated as a display for example, and an opto-mechanical parameter of each optical sensor. The display size of the curved operation surface 210 refers to, for example, a diagonal length of the curved operation surface 210, but the invention is not limited thereto. In the present embodiment, the opto-mechanical parameter of each optical sensor includes, for example, a pixel size and an equivalent focal length (EFL) of each optical sensor. For instance, each optical sensor includes, for example, a lens module and a light-sensing element. The lens module is formed by, for example, a plurality of lenses and at least configured to perform optical operations, such as focusing, refracting and the like, on the light signal, and an assembly thereof has an equivalent focal length. The light-sensing element includes a plurality of sensing pixels configured to sense the light signal received by the optical sensors. Each sensing pixel serves as a cell for sensing the light signal and has a predetermined pixel size. In the present embodiment, the light-sensing element is, for example, a charge coupled device (CCD) image sensor, a complementary metal oxide semiconductor (CMOS) image sensor or the like, which is not limited in the invention. Additionally, enough teaching, suggestion, and implementation illustration with respect to structures and operation methods of the optical sensors of the present embodiment may be obtained based on the ordinary knowledge of the art and thus, will not be repeated.

In the present embodiment, the relations among the region parameter ORA, the pixel size and the equivalent focal length meet the following expression (4):

$$ORA = \frac{DS \times PS}{EFL} \quad (4)$$

wherein DS is the display size of the curved operation surface 210, PS is the pixel size of each optical sensor, EFL is the equivalent focal length of the each optical sensor. Thus, in the present embodiment, when the display size DS, the pixel size PS and the equivalent focal length EFL are determined, the region parameter ORA may be determined according to the expression (4).

The determination of the positions for arranging the optical sensors 220_1 to 220_4 on one side of the curved operation surface 210 will be described below.

In the present embodiment, when the second pair of the optical sensors 220_1 and 220_4 are arranged on two opposite edges of curved operation surface 210 as shown in FIG. 3, it represents that the projection spacing Y2 of the second pair of the optical sensors 220_1 and 220_4 is substantially equal to a width of the curved operation surface 210. Thus, the second surface sag S2 may be determined according to the expression (3). After the second surface sag S2 is determined, the surface sag distance ΔS between the first surface sag S1 and the second surface sag S2 may be determined according to the expression (1), so as to determine the first surface sag S1. Then, after the first surface sag S1 is determined, the projection spacing Y1 of the first pair of the optical sensors 220_2 and 220_3 may be determined according to the expression (2), so as to determine the positions for arranging the first pair of the optical sensors 220_2 and 220_3 on the curved operation surface 210.

Table 1 below lists parameters with respect to positions for arranging the optical sensors when the optical touch stylus 100 depicted in FIG. 1 is applied to curved operation surfaces of three types of specifications.

TABLE 1

| | | | |
|---|---|---|---|
| Display size DS of the curved operation surface (inch) | 55 | 65 | 34 |
| Aspect ratio of the curved operation surface | 16 9 | 16 9 | 21.5 9 |
| Diagonal length of the curved operation surface (mm) | 1397 | 1651 | 863.6 |
| Width of the curved operation surface (mm) | 1217.6 | 1439.0 | 796.6 |
| Height of the curved operation surface (mm) | 684.9 | 809.4 | 333.5 |
| Radius of the curved operation surface, R (1/m) | 4200 | 5000 | 3000 |
| Projection spacing Y1 (mm) | 1000 | 1200 | 600 |
| Projection spacing Y2 (mm) | 1217.6 | 1439.0 | 796.6 |
| First surface sag S1 (mm) | 29.9 | 36.1 | 15.0 |
| Second surface sag S2 (mm) | 44.4 | 52.0 | 26.6 |
| Pixel size PS of each optical sensor (μm) | 4.8 | 4.8 | 4.8 |
| Equivalent focal length of each optical sensor, EFL (mm) | 4.2 | 4.2 | 4.2 |
| Tip length optical of the touch stylus, L (mm) | 30 | 30 | 30 |
| Region parameter of the optical touch system, ORA (mm) | 6.43 | 7.60 | 3.98 |

In Table 1 above, the width of the curved operation surface 210 refers to, for example, a size of the curved operation surface 210 in a Y direction, and the height of the curved operation surface 210 refers to, for example, a size of the curved operation surface 210 in an X direction. Additionally, in Table 1 above, although the projection spacing Y2 of the second pair of the optical sensors 220_1 and 220_4 is illustrated as being equal to the width of the curved operation surface 210 for example, the invention is not limited thereto. In other embodiments, the size of the projection spacing Y2 may be adjusted according to actual design requirements. Thus, in the present embodiment, the first surface sag S1 of the first pair of the optical sensors 220_2 and 220_3 substantially ranges between 15 and 36.1 mm. The second surface sag S2 of the second pair of the optical sensors 220_1 and 220_4 substantially ranges between 26.6 and 52 mm. The projection spacing Y1 substantially ranges between 600 and 1200. The projection spacing Y2 substantially ranges between 796.6 and 1439 mm. The display size of the curved operation surface 210 substantially ranges between 34 and 65 inches.

Therefore, according to the manner of arranging the optical sensors on the curved operation surface provided by the present embodiment, the optical touch stylus having the specific tip length may perform the touch operation on various types of curved operation surfaces, and the optical touch apparatus thereof may also provide correct touch functions correspondingly. Additionally, in the present embodiment, the tip length of the optical touch stylus may be fixed or adjustable. In an embodiment that the tip length of the optical touch stylus is adjustable, the positions for arranging the optical sensors on the curved operation surface may be determined according to the expressions (1) to (4). Alternatively, the optical sensors are first arranged on the curved operation surface, and then a tip length corresponding to the combination style of the curved operation surface and the optical sensors is calculated by substituting the results of the expressions (2) to (4) into the expression (1), and in this way, an adaptive optical touch stylus may be designed. In other words, a manufacturer may flexibly determine whether to first fix the tip length of the optical touch stylus and then arrange the positions of the optical sensors on the curved operation surface, or to first determine the positions of the optical sensors on the curved operation surface and then adjust the tip length of the optical touch stylus according to the expression (1) to (4).

Figure 4:
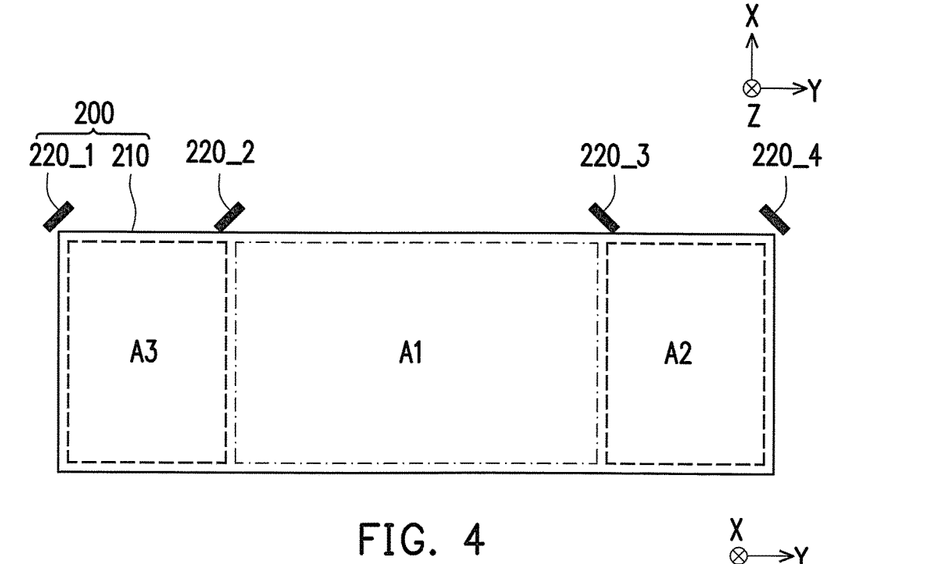
FIG. 4 is a schematic diagram illustrating the curved operation surface of the optical touch system of the embodiment depicted in FIG. 2 that is divided into a plurality of touch areas.
Figure 5:
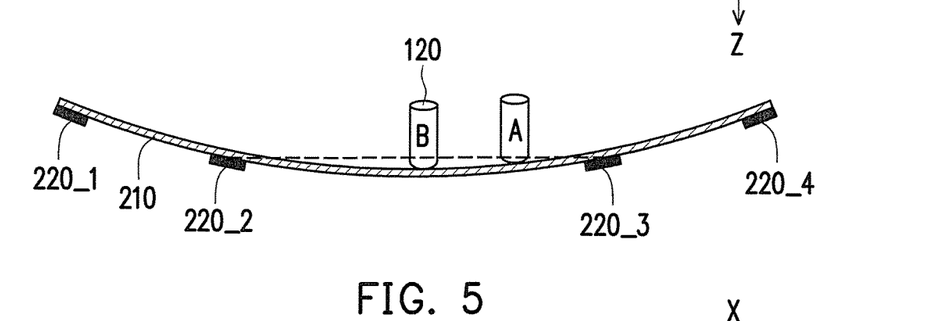
FIG. 5 and FIG. 6 are schematic diagrams respectively illustrating the optical sensors that sense different touch areas according to an embodiment of the invention.
Figure 6:
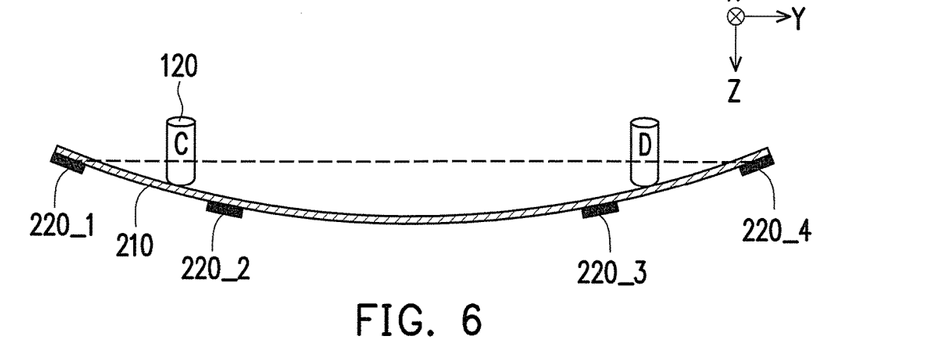

FIG. 4 is a schematic diagram illustrating the curved operation surface of the optical touch system of the embodiment depicted in FIG. 2 being divided into a plurality of touch areas. FIG. 5 and FIG. 6 are schematic diagrams respectively illustrating the optical sensors that sense different touch areas according to an embodiment of the invention. With reference to FIG. 4 to FIG. 6, the curved operation surface 210 of the present embodiment includes, for example, a plurality of touch area A1 to A3. The touch area A1 is located, for example, in the center of the curved operation surface 210, and the touch areas A2 and A3 are located, for example, at two sides of the touch area A1. However, the number and the configuration of the touch areas construe no limitations to the invention.

Specifically, in the present embodiment, the first pair of the optical sensors 220_2 and 220_3 are set to, for example, sense the touch operation of the optical touch stylus 100 occurring in the touch area A1. The second pair of the optical sensors 220_1 and 220_4 are set to, for example, sense the touch operation of the optical touch stylus 100 occurring in the touch areas A2 and A3. For instance, when the tip portion 120 of the optical touch stylus 100 taps a touch position A or a touch position B, moves from the touch position A to the touch position B, or moves from the touch position B to the touch position A, the first pair of the optical sensors 220_2 and 220_3 senses the touch operation of the optical touch stylus 100 occurring in the touch area A1. Referring to FIG. 5, the optical touch stylus 100, no matter whether being located on the touch position A or the touch position B, may be located on a connection of the first pair of the optical sensors 220_2 and 220_3 to ensure the correctness of the first pair of the optical sensors 220_2 and 220_3 sensing the touch operation and the touch position of the optical touch stylus 100. On the other hand, when the optical touch stylus 100 taps a touch position C or a touch position D, moves from the touch position C to the touch position D, or moves from the touch position D to the touch position C, the second pair of the optical sensors 220_1 and 220_4 senses the touch operation of the optical touch stylus 100 occurring in the touch areas A2 and A3. Referring to FIG. 6, the optical touch stylus 100, no matter whether being located on the touch position C or the touch position D, may be located on a connection of the second pair of the optical sensors 220_1 and 220_4 to ensure the correctness of the second pair of the optical sensors 220_1 and 220_4 sensing the touch operation and the touch position of the optical touch stylus 100. In the present embodiment, the touch position C and the touch position D are illustrated as being respectively located in the touch areas A3 and A2 for example, but the invention is not limited thereto. In other embodiments, both the touch position C and the touch position D may be located in the touch area A2 or in the touch area A3.

In the present embodiment, the touch operation of the optical touch stylus 100 occurring in the touch areas A2 and A3 are not limited to be sensed by the second pair of the optical sensors 220_1 and 220_4. In an embodiment, one of the optical sensors 220_2 and 220_3 in the first pair and one of the optical sensors 220_1 and 220_4 in the second pair may be set to sense the touch operation occurring in one of the touch areas A2 and A3. The other one of the optical sensors 220_2 and 220_3 in the first pair and the other one of the optical sensors 220_1 and 220_4 in the second pair may be set to sense the touch operation occurring in the other one of the touch areas A2 and A3.

Figure 7:
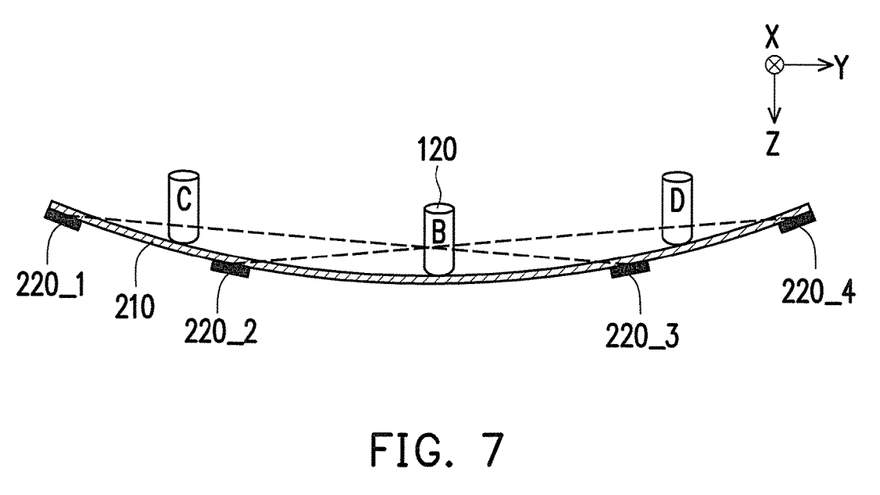
FIG. 7 is a schematic diagram illustrating the optical sensors that senses different touch areas according to another embodiment of the invention.

Specifically, FIG. 7 is a schematic diagram illustrating the optical sensors that senses different touch areas according to another embodiment of the invention. With reference to FIG. 4 and FIG. 7, in the present embodiment, the optical sensors 220_1 and 220_3 are set to sense the touch area A3, and the optical sensors 220_2 and 220_4 are set to sense the touch area A2.

For instance, when the optical touch stylus 100 taps the touch position C or the touch position B, moves from the touch position C to the touch position B, or moves from the touch position B to the touch position C, the pair of the optical sensors 220_1 and 220_3 senses the touch operation of the optical touch stylus 100 occurring in the touch area A3. Referring to FIG. 7, the optical touch stylus 100, no matter whether being on the touch position C or the touch position B, may be located on the connection of the pair of the optical sensors 220_1 and 220_3 to ensure the correctness of the pair of the optical sensors 220_1 and 220_3 sensing the touch operation and the touch position of the optical touch stylus 100. On the other hand, when the optical touch stylus 100 taps the touch position B or the touch position D, moves from the touch position B to the touch position D, or moves from the touch position D to the touch position B, the pair of the optical sensors 220_2 and 220_4 sense the touch operation of the optical touch stylus 100 occurring in the touch area A2. Referring to FIG. 7, the optical touch stylus 100, no matter whether being on the touch position B or the touch position D, may be located on the connection of the pair of the optical sensors 220_2 and 220_4 to ensure the correctness of the pair of the optical sensors 220_2 and 220_4 sensing the touch operation and the touch position of the optical touch stylus 100. In the present embodiment, the touch position B is illustrated as being located in the touch area A1 for example, but the invention is not limited thereto. In other embodiments, the touch position B may also be in the touch area A2 or the touch area A3.

The optical sensors 220_1, 220_2, 220_3 and 220_4 are all arranged on the same side (the upper side) of the curved operation surface in the embodiments above, but the arrangement may also be two on the upper side, and the other two on the lower side to be corresponding to each other in other embodiments. For example, the optical sensors 220_1 and 220_4 may be arranged on the lower side, and the optical sensors 220_2 and 220_3 may be arranged on the upper side, and vice versa. Alternatively, the optical sensors 220_1 and 220_3 may be arranged on the lower side, and the optical sensors 220_2 and 220_4 may be arranged on the upper side, and vice versa. However, to prevent an issue of mis-determination due to two optical sensors "facing to each other", a method of alternately capturing and lighting may be adopted.

To summarize, in the embodiments of the invention, positions of the optical sensors arranged on a side of the curved operation surface may be determined according to the specification of the curved operation surface and characteristics of the optical sensors. According to the determination manner, the invention may achieve not only simplification of the structure of the optical touch apparatus, but also reduction of production cost. Moreover, the optical touch stylus with a specified or unspecified tip length may perform the touch operation on various types of curved operation surfaces, and the optical touch apparatus of the optical touch stylus may also correspondingly provide correct touch functions, and thereby, the correctness of the pairs of the optical sensors sensing the touch operation and the touch position of the optical touch stylus may be enhanced.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An optical touch system, comprising: a curved operation surface, having a vertex;
   an optical touch stylus, configured to perform a touch operation on the curved operation surface and having a tip portion capable of generating a light signal; and
   a plurality of optical sensors, arranged on at least one side of the curved operation surface based on a reference line and configured to receive the light signal to sense the touch operation of the optical touch stylus performed on the curved operation surface,
   wherein a surface sag exists between each of the optical sensors and the vertex,
   wherein a distance of two selected surface sags is determined according to a tip length of the optical touch stylus and a region parameter of the optical touch system, such that a difference between a tip length of the optical touch stylus and the distances of two selected surface sags is not smaller than the region parameter of the optical touch system,
   wherein the region parameter of the optical touch system is determined according to a multiplication of a display size of the curved operation surface and a pixel size of each optical sensor divided by an equivalent focal length of each optical sensor.

2. The optical touch system according to claim 1, wherein the optical sensors comprise:
   a first pair of the optical sensors, symmetrically arranged on a side of the curved operation surface based on the reference line and having a first surface sag relative to the vertex; and
   a second pair of the optical sensors, symmetrically arranged on the side or another side opposite to the side of the curved operation surface based on the reference line and having a second surface sag relative to the vertex,
   wherein the distance of the two selected surface sags is a distance between the first surface sag and the second surface sag.

3. The optical touch system according to claim 2, wherein the first surface sag is determined according to a curvature radius of the curved operation surface and a first projection spacing of the first pair of the optical sensors on a projection line, and the second surface sag is determined according to the curvature radius of the curved operation surface and a second projection spacing of the second pair of the optical sensors on the projection line.

4. The optical touch system according to claim 3, wherein the first projection spacing is smaller than the second projection spacing.

5. The optical touch system according to claim 2, wherein projection positions of the first pair of the optical sensors on a projection line are located between projection positions of the second pair of the optical sensors on the projection line.

6. The optical touch system according to claim 2, wherein the curved operation surface comprises a first touch area and a plurality of second touch areas at two sides of the first touch area, and the first pair of the optical sensors is configured to sense the touch operation occurring in the first touch area.

7. The optical touch system according to claim 6, wherein the second pair of the optical sensors is configured to sense the touch operation occurring in the second touch areas.

8. The optical touch system according to claim 6, wherein one of the optical sensors in the first pair and one of the optical sensors in the second pair are configured to sense the touch operation occurring in one of the second touch areas, and the other one of the optical sensors in the first pair and the other one of the optical sensors in the second pair are configured to sense the touch operation occurring in another one of the second touch areas.

9. The optical touch system according to claim 1, wherein the optical touch stylus comprises a body portion and the tip portion, the tip portion and the body portion are connected with each other and configured to generate and transmit the light signal to the optical sensors, wherein the tip length of the optical touch stylus is a length of the tip portion.

10. The optical touch system according to claim 9, wherein the body portion drives the tip portion to generate the light signal to transmit the light signal to each of the optical sensors, wherein each of the optical sensors determines a touch position of the optical touch stylus on the curved operation surface according to the light signal generated by the tip portion.

11. The optical touch system according to claim 9, wherein each of the optical sensors comprises a light-emitting element to generate an original light signal to the optical touch stylus, and the original light signal is reflected by the tip portion to generate the light signal to be transmitted to each of the optical sensors, wherein each of the optical sensors determines a touch position of the optical touch stylus on the curved operation surface according to the light signal reflected by the tip portion.

12. The optical touch system according to claim 1, wherein the curved operation surface is a surface of one of a display, a television, a banner and an electronic whiteboard.

13. An optical touch apparatus, configured to sense a touch operation of an optical touch stylus, and the optical touch apparatus comprising: a curved operation surface, having a vertex; and
a plurality of optical sensors, arranged on at least one side of the curved operation surface based on a reference line and configured to receive a light signal to sense the touch operation of the optical touch stylus performed on the curved operation surface,
wherein a surface sag exists between each of the optical sensors and the vertex,
wherein a distance of two selected surface sags is determined according to a tip length of the optical touch stylus and a region parameter of the optical touch apparatus, such that a difference between a tip length of the optical touch stylus and the distances of two selected surface sags is not smaller than the region parameter of the optical touch apparatus,
wherein the region parameter of the optical touch apparatus is determined according to a multiplication of a display size of the curved operation surface and a pixel size of each optical sensor divided by an equivalent focal length of each optical sensor.

14. The optical touch apparatus according to claim 13, wherein the optical sensors comprise:

a first pair of the optical sensors, symmetrically arranged on a side of the curved operation surface based on the reference line and having a first surface sag relative to the vertex; and
a second pair of the optical sensors, symmetrically arranged on the side or another side opposite to the side of the curved operation surface based on the reference line and having a second surface sag relative to the vertex,
wherein the distance of the two selected surface sags is a distance between the first surface sag and the second surface sag.

15. The optical touch apparatus according to claim 14, wherein the first surface sag is determined according to a curvature radius of the curved operation surface and a first projection spacing of the first pair of the optical sensors on a projection line, and the second surface sag is determined according to the curvature radius of the curved operation surface and a second projection spacing of the second pair of the optical sensors on the projection line.

16. The optical touch apparatus according to claim 15, wherein the first projection spacing is smaller than the second projection spacing.

17. The optical touch apparatus according to claim 14, wherein projection positions of the first pair of the optical sensors on a projection line are located between projection positions of the second pair of the optical sensors on the projection line.

18. The optical touch apparatus according to claim 14, wherein the curved operation surface comprises a first touch area and a plurality of second touch areas at two sides of the first touch area, and the first pair of the optical sensors is configured to sense the touch operation occurring in the first touch area.

19. The optical touch apparatus according to claim 18, wherein the second pair of the optical sensors is configured to sense the touch operation occurring in the second touch areas.

20. The optical touch apparatus according to claim 18, wherein one of the optical sensors in the first pair and one of the optical sensors in the second pair are configured to sense the touch operation occurring in one of the second touch areas, and the other one of the optical sensors in the first pair and the other one of the optical sensors in the second pair are configured to sense the touch operation occurring in another one of the second touch areas.

21. The optical touch apparatus according to claim 13, wherein the curved operation surface is a surface of one of a display, a television, a banner and an electronic whiteboard.

22. An optical touch stylus, configured to perform a touch operation on a curved operation surface with a vertex of an optical touch apparatus having a plurality of optical sensors arranged on at least one side of the curved operation surface, wherein a surface sag exists between each of the optical sensors and the vertex , comprising:
a tip portion, generating a light signal,
wherein a tip length of the optical touch stylus is determined according to a distance of two selected surface sags and a region parameter of the optical touch apparatus, and a difference between the tip length of the optical touch stylus and the distances of two selected surface sags is not smaller than the region parameter of the optical touch apparatus,
wherein the region parameter of the optical touch apparatus is determined according to a multiplication of a display size of the curved operation surface and a pixel size of each optical sensor divided by an equivalent focal length of each optical sensor.

23. The optical touch stylus according to claim 22, wherein the optical touch stylus comprises a body portion and the tip portion, the tip portion and the body portion are connected with each other and configured to generate and transmit the light signal to the optical sensors, wherein the tip length of the optical touch stylus is a length of the tip portion.

24. The optical touch stylus according to claim 23, wherein the body portion drives the tip portion to generate the light signal to transmit the light signal to each of the optical sensors, wherein each of the optical sensors determines a touch position of the optical touch stylus on the curved operation surface according to the light signal generated by the tip portion.

25. The optical touch stylus according to claim 23, wherein each of the optical sensors comprises a light-emitting element to generate an original light signal to the optical touch stylus, and the original light signal is reflected by the tip portion to generate the light signal to be transmitted to each of the optical sensors, wherein each of the optical sensors determines a touch position of the optical touch stylus on the curved operation surface according to the light signal reflected by the tip portion.

* * * * *